May 11, 1954  L. W. BIRBAUM  2,678,117
CLUTCH AND STARTER
Filed May 11, 1950

*INVENTOR.*
Lester W. Birbaum
BY
*John W. Michael*
Attorney

Patented May 11, 1954

2,678,117

UNITED STATES PATENT OFFICE 2,678,117

CLUTCH AND STARTER

Lester W. Birbaum, Oconomowoc, Wis., assignor to La Belle Industries, Inc., Oconomowoc, Wis., a corporation of Wisconsin Application May 11, 1950, Serial No. 161,382

1 Claim. (Cl. 192—48)

This invention relates to a clutch and starter.

An object of this invention is to provide a simple, compact and rugged clutch and starter assembly.

A further object is to provide a clutch and starter assembly wherein a non-overriding clutch delivers power in one direction and an overriding clutch delivers power in another direction and the input side of the non-overriding clutch is the output side of the overriding clutch and vice versa.

Another object is to provide a compact assembly including a centrifugal clutch for transmitting power from a power source to a normally driven device and a starter for delivering power to the power source from the driven device.

Another object is to provide a compact device having a unidirectional overriding starter for delivering starting power from a normally driven unit to an engine and a centrifugal clutch for drivingly connecting the engine to the driven unit.

The illustrated embodiment is particularly designed for use with motor bikes and similar vehicles, but it should be understood the application of the invention is not limited to such specific purposes. The illustrated form shows a centrifugal clutch mounted on a shaft for driving the shaft when an engine rotates the input side of the clutch at a predetermined speed. The shaft is drivingly connected to the bicycle wheel. The clutch is incapable of driving from the wheel to the engine for starting purposes. Therefore, an overriding starter is provided for starting and to prevent free-wheeling above a predetermined speed. When the engine starts, the starter is automatically overridden and the drive clutch becomes operative. The drive clutch is speed responsive to permit the engine to idle when the bicycle is at rest and to prevent stalling the engine due to overload. The starter, driven by the wheel, engages whenever rotating above a predetermined speed and at a speed greater than the input side of the drive clutch, thus preventing free-wheeling above the predetermined speed.

In view of the above remarks it will be appreciated that a further object of this invention is to provide a compact, low-cost clutch and starter suitable for use on motor bikes and similar vehicles.

Still a further object is to provide a clutch and starter assembly wherein a non-overriding clutch constitutes the normal drive from one power input or take-off device to another power input or take-off device and an overriding clutch constitutes the drive means from said other device to said one device.

Another object is to provide an assembly such as described in the preceding paragraph wherein both of the clutches are speed responsive.

Still another object is to provide a clutch and starter assembly for use on motor vehicles which prevents free-wheeling at speeds in excess of a predetermined maximum.

Objects and advantages other than those above set forth will be apparent from the following description when read in connection with the accompanying drawing in which.

Figure 1:
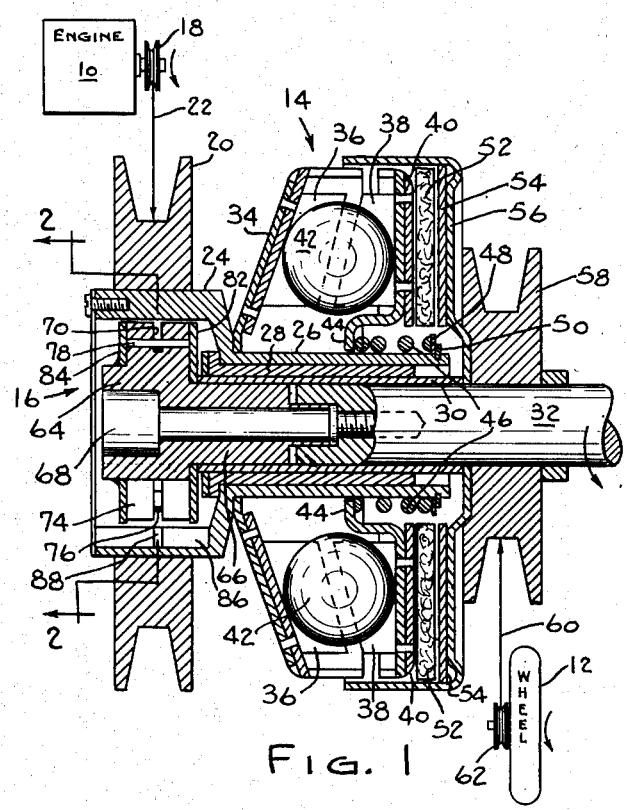
Fig. 1 is a partly schematic view showing a cross section of the clutch and starter mechanism as used in driving a wheel by means of an engine.

In the drawings the clutch and starter assembly transmits power from engine 10 to bicycle wheel 12 through centrifugal clutch 14. When desired, the bicycle can be peddled in the usual fashion to turn wheel 12 and feed power back to the engine through unidirectional starter 16 until the engine starts. When the engine rotates the speed responsive clutch 14 at a speed greater than the speed of the starter, the starter is overridden and ceases to function as a power feedback.

Engine sheave 18 turns drive sheave 20 by means of belt 22. Sheave 20 is welded or brazed on the enlarged diameter portion 24 of sleeve 26 which is pressed on bushing or bearing 28. Bearing 28 is rotatably mounted on sleeve 30 welded on, or integral with shaft 32. Therefore, drive sheave 20 and sleeve 26 are rotatable with respect to shaft 32. Dished drive plate 34 of the input side of the centrifugal clutch is welded or brazed to the sleeved member 26 for rotation therewith. A plurality of hardened channels 36 are secured to the inside face of drive plate 34 to cooperate with channels 38 on driven plate 40 to engage and guide balls 42 and transmit rotational movement to the driven plate. The inner ends of driven channels 38 are provided with formed tongues 44 which cooperate with sleeve 26 to center driven plate 40 and to serve as a seat for spring 46 compressed between the tongue and washer 48 retained on sleeve 26 by snap ring 50. The tongues also serve as seats for balls 42 when they are moved in toward the shaft by spring 46 urging the driven plate 40 toward the left. When the input side of the clutch is rotated at a predetermined speed, the balls 42 are thrown outwardly against the bias of spring 46 to force the drive plate to the right and sandwich friction disk 52 between the driven plate and output plate 54 welded on housing 56. Housing 56 and driven sheave 58 are fixed on shaft 32. Therefore, when the input side of the clutch attains a predetermined speed, the clutch engages and drives sheave 58 and shaft 32 to turn bicycle wheel 12 by means of belt 60 connected to wheel sheave 62.

At this point it will be appreciated that after the engine has been started the bicycle wheel will be driven upon the engine speed reaching that necessary to engage the centrifugal clutch. This clutch remains engaged as long as the engine speed is greater than the engaging speed. When the engine speed is decreased below the predetermined R. P. M. spring 46 will force driven plate 40 to the left to disengage the clutch. This allows the bicycle to be stopped with the engine idling, thus avoiding stalling the engine at every stop.

Details of this drive clutch are shown and claimed in my co-pending application for "Centrifugal Clutch," Serial No. 160,307, filed May 5, 1950.

Figure 2:
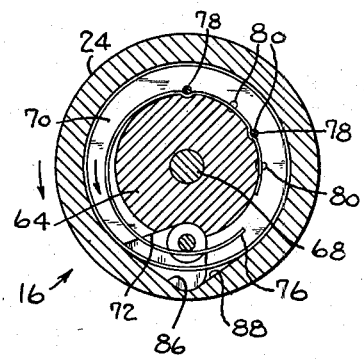
Fig. 2 is a cross section of the starter mechanism taken on line 2—2 of Fig. 1.
Figure 3:
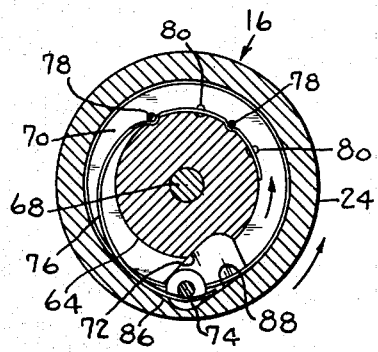
Fig. 3 shows the starter in the position occupied when the wheel is driving the engine.
Figure 4:
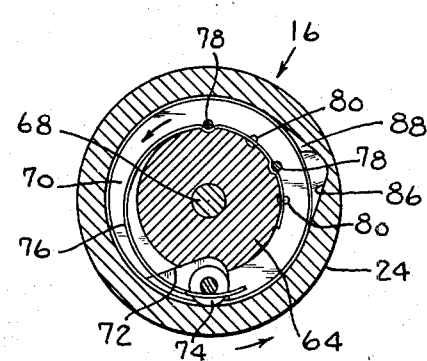
Fig. 4 shows the starter position occupied when overridden by the engine drive.

To avoid the necessity of starting the engine by means of a rip cord or other means, this mechanism is provided with a starter for feeding power from the wheel to the engine. This starter comprises a unidirectional centrifugally responsive clutch including rotor 64 having a shaft portion 66 fitting within sleeve 30 to drivingly engage the end of shaft 32 by means of a conventional slot connection. The rotor is secured to shaft 32 by means of a headed bolt 68. The rotor has a peripheral slot 70 and a cut-out portion 72. A peripherally slotted cylindrical roller 74 is positioned in rotor notch 72 where spring 76 urges the roller toward the center of the rotor. Spring 76 lies in peripheral slot 70 in the rotor and passes through the slot in roller 74. This spring may be piano wire or the like and need not have great power. The spring is fixed on the rotor by means of stakes 78 driven through the rotor parallel to the shaft axis at a depth, with respect to the slot, sufficient to crimp the spring as shown in Figs. 2 through 4. As may be seen in Figs. 2 through 4, a plurality of holes 80 is provided for stake 78 so that the anchor point may be varied to change the spring rate. As the stake position approaches the free end of spring 76, the cantilever arm of the spring is shortened and the spring exerts a greater force opposing centrifugal force. As the spring rate is increased, the engaging speed of the starter clutch increases. With this construction the characteristics of a single spring may be varied to meet many needs. The stake is prevented from axial movement by means of disks 82, 84 on each side of the rotor.

The inside of the belled or enlarged diameter portion 24 of sleeve 26 is provided with a complementary notch 86 adapted to receive weight 74 when it is thrown outwardly by centrifugal force. The belled member 24 is also provided with a slot 88 adapted to receive the free end of spring 76 to prevent damage thereto as would be occasioned with the spring if it were allowed to be bent.

When the starter is rotated in a clockwise direction (Figs. 2 through 4) the weight 74 will be thrown outwardly by centrifugal force when the predetermined speed is reached. As the weight passes bell notch 86 it is thrown into the notch where it is immediately wedged between the generally radial edge of bell notch 86 and the inclined edge of the rotor notch 72, as illustrated in Fig. 3. This causes bell 24 to be "picked up" to rotate with the rotor. Since drive sheave 20 is brazed on the bell, engine 10 will be driven. When the engine starts and the drive sheave speed exceeds the speed of shaft 32, the rotational speed of bell 24 in the clockwise direction is greater than the rotor speed. Therefore, the inclined surface of the bell notch 86 will force weight 74 back into the rotor notch to allow the bell 24 to override the starter. If the speed of the engine is increased to engage clutch 14, shaft 32 and the starter are driven by the engine. Assuming that there is no clutch slip, the starter does not drive or engage the bell since the speeds are the same. In practice, however, there is some clutch slip and the bell rotates faster than the starter and the starter is overridden.

From the above description it will be appreciated that the bicycle may be peddled until a predetermined speed is reached, at which time the starter engages to drive the engine and start the engine. This allows a desirable speed to be reached before taking on the engine load. When the engine is started, the unidirectional starter clutch is overridden and drive clutch 14 may be engaged by accelerating the engine to the engaging speed. This insures that the engine speed is great enough to pick up the load, thus avoiding stalling the engine. To stop the bicycle the engine is decelerated below the engaging speed. It is to be noted that it is practically impossible to stall this engine since any excessive load tending to slow down and stall the engine disengages the centrifugal clutch before the stalling speed is reached.

Should the bicycle coast down a hill with the drive clutch engaged, it will be apparent that the bicycle does not free-wheel since the drive clutch remains engaged and causes the bicycle to work against the engine. It will be noted that if the engine is decelerated while the bicycle is coasting down the hill, the clutch will remain engaged. Should the clutch slip under these conditions the starter will engage since its speed is greater than the speed of the input side of the clutch. If the clutch is disengaged and the bicycle coasts down a hill, the bicycle will free-wheel only so long as the starter (which is driven by the bicycle wheel) rotates at a speed below its engaging speed. However, upon the starter reaching its predetermined speed, it will engage and pick up the input side of the drive clutch (rotating at a speed less than the starter speed). This causes a direct drive back to the engine to prevent free-wheeling at high speeds. After the drive clutch has been engaged it cannot be overridden. The starter clutch is, of course, overridden upon the engine starting since the starter is unidirectional.

This clutch is extremely compact and is fabricated of simple parts which may be manufactured at low cost. All the parts employed are rugged and may be subjected to hard use without adverse effects. The design permits of a wide range of operating characteristics with the same basic unit. Thus the engaging speed of clutch 14 may be varied by changing spring 46, by changing the size of balls 42, or by a combination of such changes. Similarly, the operating characteristics of the starter clutch may be varied by changing the rate of spring 76 per se or by changing the rate by varying the staking point to change the cantilever characteristics of the spring. The weight of roller 74 may be changed to affect the engaging speed.

From the above description it will be appreciated that changes may be made without departing from the spirit of this invention. Therefore, this invention is to be limited only by the scope of the claim.

A clutch and starter comprising, a shaft, a member rotatably mounted on said shaft, a drive sheave fixed on said member and adapted to be driven by an external power source, a speed responsive centrifugal clutch mounted on said shaft, the input side of the clutch including a dished drive plate fixed with respect to said member and a cooperative driven plate free on said member, said plates being mounted in opposed, spaced relation, radially disposed, circumferentially spaced, complemental channel members mounted on the opposed faces of said plates, a plurality of balls movably disposed between said plates and within said channels and mechanically coupling said plates for rotation in unison, said balls being movable radially outwardly within said channels under the influence of centrifugal force, spring means urging said cooperating plate towards said dished plate and in opposition to the action of centrifugal force on said balls, the output side of said clutch including a plate fixed on said shaft, a friction disk between said last-mentioned plate and said cooperating driven plate for transmitting power through the clutch to said shaft when said balls are thrown centrifugally outwardly to force said cooperating driven plate against the friction disk, and an overriding starter clutch rotatable with said shaft and including means operative to drivingly engage said member when said shaft is rotated at a speed above a predetermined speed and at a speed greater than the speed of said member.

References Cited in the file of this patent

UNITED STATES PATENTS

| Number | Name | Date |
|---|---|---|
| 1,678,638 | Dunham | July 31, 1928 |
| 1,859,334 | Karle | May 24, 1932 |
| 1,889,291 | Pirinoli | Nov. 29, 1932 |
| 2,357,284 | Peterson et al. | Sept. 5, 1944 |
| 2,529,919 | Cunningham | Nov. 14, 1950 |